(12) United States Patent
Snyder

(10) Patent No.: US 12,268,197 B2
(45) Date of Patent: Apr. 8, 2025

(54) ELECTRIC POWERHEAD DEVICE

(71) Applicant: Elizabeth Ann Snyder, Apopka, FL (US)

(72) Inventor: Elizabeth Ann Snyder, Apopka, FL (US)

( * ) Notice: Subject to any disclaimer, the term of this patent is extended or adjusted under 35 U.S.C. 154(b) by 68 days.

(21) Appl. No.: 18/241,734

(22) Filed: Sep. 1, 2023

(65) Prior Publication Data

US 2024/0081303 A1 Mar. 14, 2024

Related U.S. Application Data

(63) Continuation of application No. 18/215,537, filed on Jun. 28, 2023, now Pat. No. 11,968,986.

(60) Provisional application No. 63/405,348, filed on Sep. 9, 2022, provisional application No. 63/389,645, filed on Jul. 15, 2022.

(51) Int. Cl.
*A01K 81/00* (2006.01)
*A01K 81/04* (2006.01)

(52) U.S. Cl.
CPC .................. *A01K 81/04* (2013.01)

(58) Field of Classification Search
CPC .... A01K 99/00; A01K 83/00; A01K 2207/00; A01K 81/04; H05C 1/00
USPC ........................................ 43/17.1, 6; 452/57
See application file for complete search history.

(56) References Cited

U.S. PATENT DOCUMENTS

| | | | | |
|---|---|---|---|---|
| 3,083,491 A | * | 4/1963 | Meysan | A01K 85/16 43/17.1 |
| 4,627,187 A | * | 12/1986 | Williams | A01K 85/00 43/17.1 |
| 5,259,139 A | * | 11/1993 | Ho | A01K 91/06 43/17.1 |
| 5,732,501 A | * | 3/1998 | Ausburn | A01K 97/14 43/17.1 |
| 6,183,356 B1 | * | 2/2001 | Middleton | A22C 25/08 452/65 |
| 6,963,480 B2 | * | 11/2005 | Eccles | F41H 13/0018 361/232 |
| 7,174,668 B2 | * | 2/2007 | Locklear | A01K 79/02 231/7 |
| 8,091,269 B2 | * | 1/2012 | Orchard | H05C 1/02 43/17.1 |
| 8,555,543 B2 | * | 10/2013 | Baldassano | F41B 15/04 43/17.1 |

(Continued)

*Primary Examiner* — Richard T Price, Jr.
(74) *Attorney, Agent, or Firm* — Jason T. Daniel, Esq.; Daniel Law Offices, P.A.

(57) ABSTRACT

An electric powerhead device includes an elongated pole having a penetrating head that is positioned along the second end of the pole. The penetrating head includes a metallic and electrically conductive shaft, sharpened tip and barbs for engaging a target. A pair of electrodes are provided along the shaft and are connected to a power source within the pole. The power source includes a plurality of batteries that provide power to the device components. A power output unit amplifies and sends power to the electrodes based on a command from a user interface. The power output is adjustable via the user interface to either stun or dispatch a target. The pole is buoyant for being thrown into the water and delivers an electric shock upon detecting that the penetrating head has made contact with the target. A connector is provided on the pole and is secured to a rope.

8 Claims, 3 Drawing Sheets

(56) References Cited

U.S. PATENT DOCUMENTS 8,724,287 B2 * 5/2014 Hanchett ............ F41H 13/0025
361/232
2006/0168872 A1 8/2006 Locklear

* cited by examiner

ELECTRIC POWERHEAD DEVICE

CROSS-REFERENCE TO RELATED APPLICATIONS

This application claims the benefit of U.S. Application Ser. No. 63/405,348 filed on Sep. 9, 2022, and is a continuation in part to copending U.S. application Ser. No. 18/215,534 filed on Jun. 28, 2023, the contents of each of which are incorporated herein by reference.

TECHNICAL FIELD

The following disclosure relates generally to alligator hunting and large fish harvesting, and more particularly to an electric powerhead device that can function as both a bang stick and harpoon.

BACKGROUND

The statements in this section merely provide background information related to the present disclosure and may not constitute prior art.

When hunting for alligators many hunters utilize a bang stick device comprising an elongated pole having a powerhead device on the distal end. Typically, the powerhead utilizes a firearm cartridge that is triggered through contact between the pole and the animal to quickly dispatch the animal at close range. However, there are several inherent risks associated with the use of these types of firearm devices in close or direct proximity to a thrashing animal. As such, many accidents have occurred wherein the firearm projectile has struck nearby individuals, and some of these accidents have led to a loss of human life.

In addition to the above, many sport fisherman utilize hand thrown harpoons when hunting large fish such as tuna, halibut or mahi, for example. As is known, such devices comprise, essentially, an elongated spear having a sharpened tip at the end for engaging the fish from a distance. Unfortunately, it is not common for these devices to engage and injure a fish before becoming dislodged by the thrashing of the fish. Even when the device does not become dislodged, the bleeding fish thrashes violently which has a tendency to attract sharks and other nearby predators who may attack and eat the fish.

However, even when the fisherman is able to ultimately capture the fish, the violent thrashing performed by the fish during the prolonged struggle produces high amounts of lactic acid which adversely impacts the flavor of the fish meat, which may render the same to be unsatisfactory for human consumption.

Accordingly, it would be beneficial to provide an electric powerhead device that can be used in a plurality of different hunting and fishing situations so as to quickly stun or dispatch an intended target, thus eliminating the drawbacks and dangers noted above.

SUMMARY OF THE INVENTION

The present invention is directed to an electric powerhead device. One embodiment of the present invention can include an elongated pole having at least one penetrating head that is positioned along the second end of the pole. The penetrating head can include a metallic and electrically conductive shaft, sharpened tip and barbs for engaging a target. A pair of electrodes can be provided along the shaft and can be connected to a power source within the pole.

The power source can include a plurality of batteries that provide power to the device components. The power output unit can amplify and send power to the electrodes based on a command from the user interface. The power output can be adjusted by the user interface to either stun or dispatch a target.

In one embodiment, the device can be configured to be thrown by a user and to deliver an electric shock upon detecting that the penetrating head has made contact with the target. A connector can be provided on the second end of the pole and can be secured to a rope for allowing a user to retrieve the device.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably positioned," and derivatives thereof shall be used to describe a situation wherein two or more objects are joined together in a non-permanent manner so as to allow the same objects to be repeatedly joined and separated.

Figure 1:
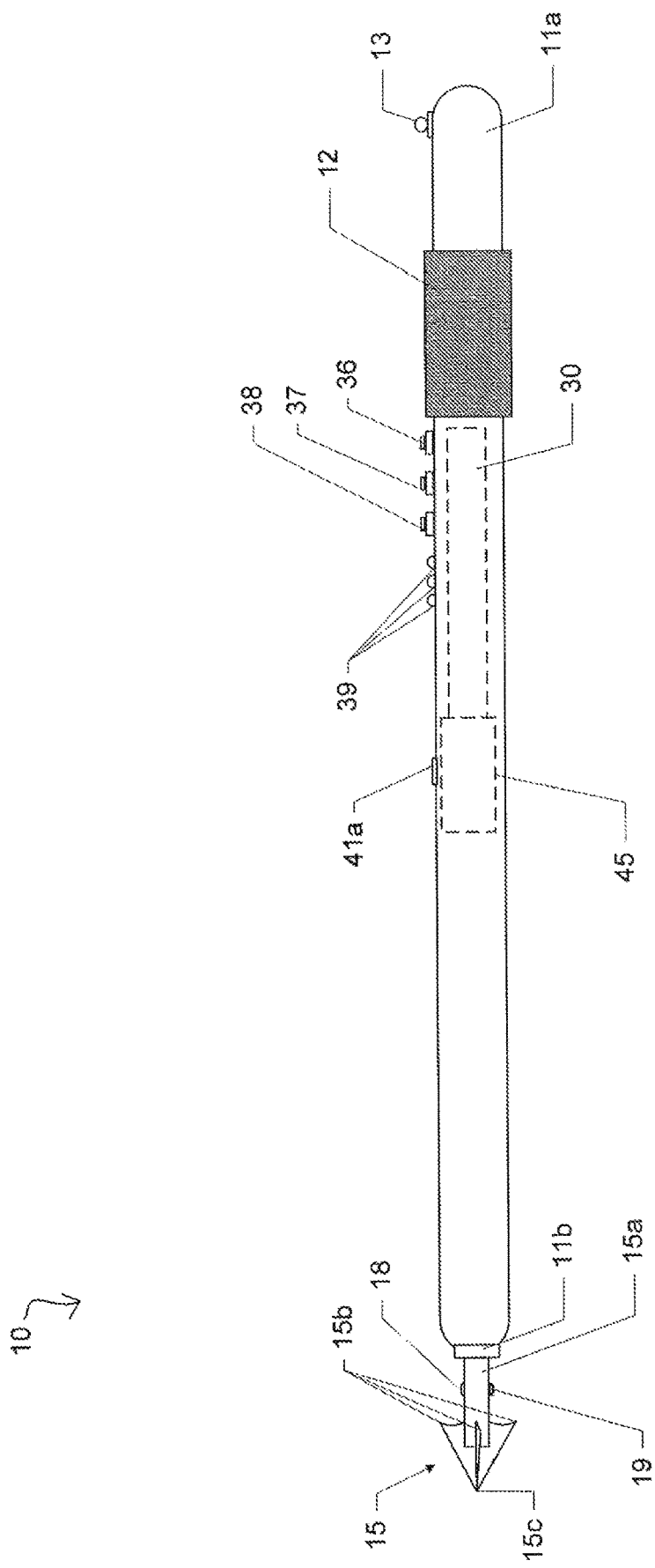
FIG. 1 is a side view of one embodiment of the electric powerhead device that is useful for understanding the inventive concepts disclosed herein.
Figure 2:
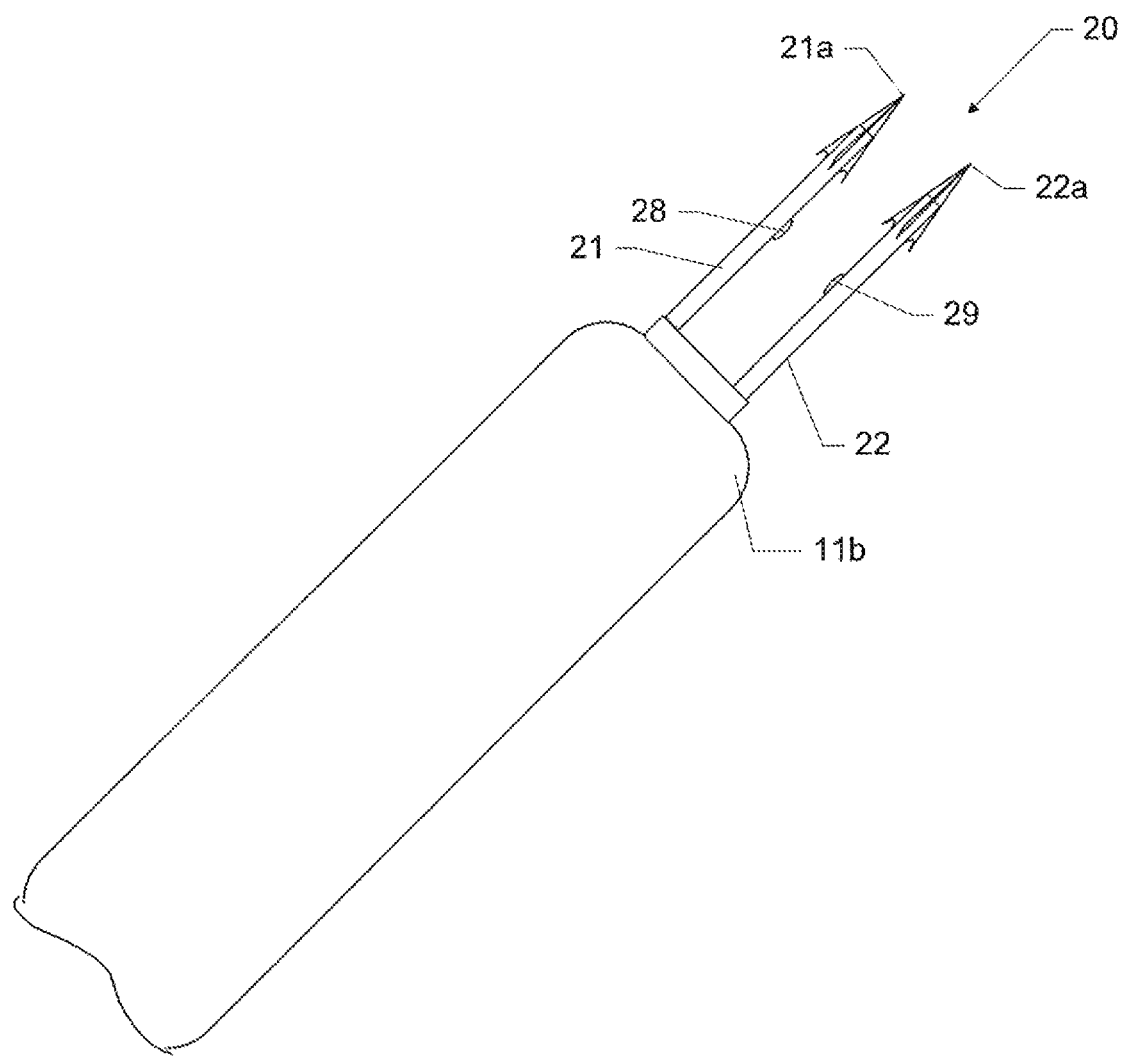
FIG. 2 is a perspective view of the distal end of the electric powerhead device in accordance with one embodiment of the invention.
Figure 3:
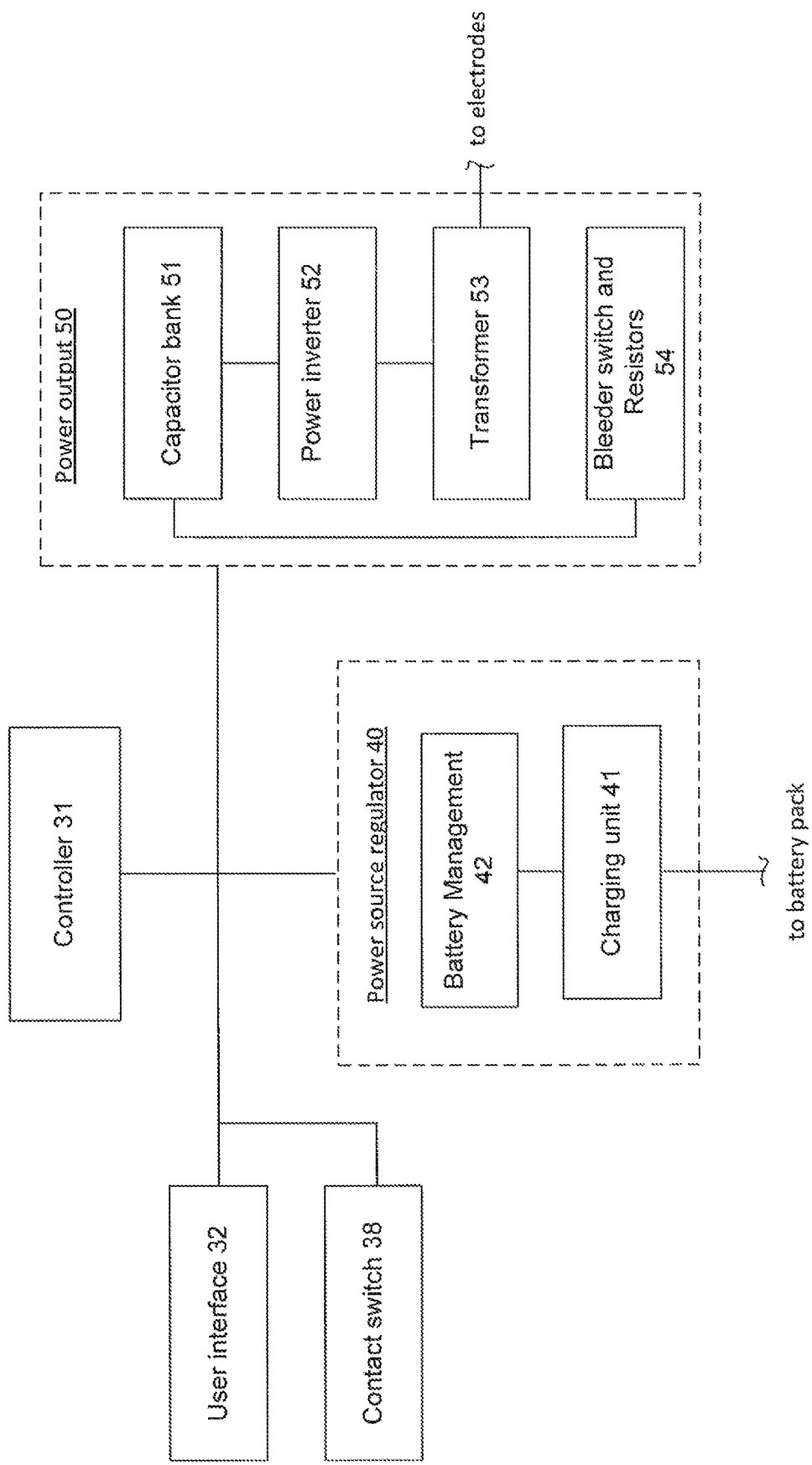
FIG. 3 is a simplified block diagram of the electronic suite of the electric powerhead device, in accordance with one embodiment of the invention.

FIGS. 1-3 illustrate one embodiment of an electric powerhead device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown and described below, one embodiment of the electric powerhead device 10 can include a main body in the form of an elongated pole having a sharpened tip along one end. A plurality of electrodes is provided along the device and function to deliver an electrical shock suitable to stun or dispatch a target such as an alligator or large fish (e.g., fish weighing at or above 40 pounds).

As shown best at FIG. 1, the elongated pole 11 can include a first end 11a and a second end 11b. In the preferred embodiment, the pole can be constructed from or covered with a lightweight, buoyant, and electrically isolative (i.e., non-electrically conductive) material such as wood, plastic, or composite materials, for example, however any number of other materials are also contemplated.

In one embodiment, the pole can be manufactured as a fixed-length device, but other embodiments are contemplated wherein the pole can be constructed from two or more segments that are telescopically engaged so as to allow a user to increase or decrease the length of the pole.

In one embodiment, one or more hand grips 12 can be positioned along the length of the pole. Each of the grips can also be constructed from electrically isolative materials such as rubber or foam, for example, so as to provide a second layer of shock protection to a user of the device, and for increasing the grip of a user when the device is wet. Moreover, the grips will provide additional buoyancy to the device to ensure the device floats in both salt and freshwater environments.

In one embodiment, a connector 13 such as a clip, ring, loop or other such device can be provided along the body, preferably at the first end 11a. As will be described below, the connector can function to secure a rope, cord, or tether onto the main body when the device is used as a harpoon. Such a feature allows a user to quickly and easily retrieve the device if the throw does not successfully engage the target, and to retrieve the target upon successful engagement.

As shown, the device can include a penetrating head 15 that extends outward longitudinally from the second end of the pole 11b. The head can function to pierce the flesh of a target, and can include a shaft 15a, a plurality of barbs 15b and a sharpened tip 15c. In the preferred embodiment, the penetrating head will be constructed from a strong, rugged, and electrically conductive material such as stainless steel, for example, that is resistant to bending, and is suitable for prolonged exposure to marine environments. Of course, any number of other materials are also contemplated.

In one embodiment, the device can include functionality for delivering an AC voltage across a plurality of electrodes to selectively incapacitate a fish or alligator that is engaged by the penetrating head 15. In the preferred embodiment, two electrodes 18 and 19 can be provided along the shaft portion of the penetrating head 15 at a location adjacent to the barbs. Each of the electrodes can be electrically connected to the below described electronic suite 30 and power source 45 and can be selectively activated via the onboard controller such that a voltage is provided to one electrode (e.g., 18) relative to the other electrode (e.g., 19) sufficient to stun or dispatch the target depending on the user control settings.

Of course, other embodiments are contemplated wherein the penetrating head 15 includes a different shape or size, and/or wherein any number of additional electrodes may be positioned at different locations along either the penetrating head or the main body.

For example, FIG. 2 illustrates another embodiment of a penetrating head 20 which can also be secured onto the distal end of the main body 11b. As shown, penetrating head 20 can include two separate elongated shafts 21 and 22 each having a sharpened tip 21a and 22a, respectively. In the present embodiment, electrodes 28 and 29 are positioned along shafts 21 and 22, respectively and work together such that one shaft 21 has a high discharge electrode 28, and the other shaft 22 has a low/ground electrode 29.

FIG. 3 illustrates one embodiment of the electronic suite 30 of the device 10. As shown, the suite can include a controller 31 that is in electrical communication with a user interface 32, power source regulator 40, and a power output unit 50. Various components of the electronic suite can be provided as one or more single units sealed in a watertight manner within the main body and may be connected together in accordance with known methodologies using any number of components and communication devices such as various communication and power cables, system bus, pic controllers and the like, in order to achieve the functionality described herein.

The system controller 31 can function to control the operation of the power source and power output unit so as to selectively discharge an AC voltage across two electrodes in the penetrating head(s) of the device in response to a command from the user interface. In various embodiments, the controller 31 can include, comprise, or consist of one or more printed circuit boards (PCB) containing any number of integrated circuits to complete the activities described herein. To this end, the controller can include one or more processors and/or central processing units that are conventionally connected to one or more memory components for storing operating instructions in the form of program code for the processor(s) to execute.

The controller can include or can be connected to a user interface 32 for sending and/or receiving operating instructions or information with a device user. As described herein, the user interface can include any number of different components capable of sending and/or receiving instructions from a device user. In the illustrated embodiment, the user interface 32 can include a plurality of distinct buttons such as a charge/arm switch 33, an instant discharge switch 34, an impact discharge switch 35, and a disarm switch 36, along with any number of visual display elements 37 such as multicolor LED lights, for example.

In the preferred embodiment, the instant shock switch 34 and impact shock switch 35 can each be magnetically isolated and can include safety features such as a 2-stage activation (e.g., requiring a user to twist and then depress the button) or other such functionality for preventing inadvertent activation of the electrodes. Additionally, the interface can include settings for allowing a user to choose or alter the shock intensity (e.g., voltage or amperage) and/or shock time at which the electrodes discharge. Such a feature allows a user to alter the device for use with different types or sized targets.

Of course, other embodiments are contemplated wherein different components such as a display screen or touchscreen are provided, among others, for example.

In one embodiment, a contact detection sensor 38 can be positioned along or within the device and can function to notify the controller when the penetrating head 15 has made an impact with a target. The contact detection sensor can include any number of shock sensors, impact sensors and/or accelerometers that are capable of detecting rapid deceleration of the device associated with the penetrating head contacting a target.

The power source regulator 40 can function to receive and store power from an onboard battery pack 45 located within the main body of the device. In one embodiment, the power source regulator can include a battery charging unit 41 and a battery management unit 42.

As described herein, the battery pack 45 can include any number of individual power cells which may be arranged serially and/or in parallel to produce a desired voltage such as 12v, 18v, 20v and/or 40v, for example. In the preferred embodiment, the cells will comprise lightweight, rechargeable, lithium-ion polymer (LiPo) batteries; however, any number of other battery types are also contemplated. Several nonlimiting examples include nickel-cadmium (NiCd), nickel-metal hydride (NiMH), lithium-ion (Li-ion), and rechargeable alkaline batteries, for example. Although described as a battery pack, other embodiments are contemplated wherein a single battery is utilized. The battery pack 45 will preferably be located along the middle of the pole 11 so as to provide for balanced weight and to make for easier handling especially when the main body is being thrown.

The battery charging unit 41 can preferably include an internally located transformer, charger and other circuitry that converts received power into a usable electrical charge for the battery pack 45. To this end, the type of charger and the output voltage will be dependent on the type of cells used in the battery pack 45. For example, if the above described LiPo batteries are utilized within the battery pack, the charger 41 would comprise a Lithium-Ion battery charger having built-in cell balancer. In either instance, the battery charger may include a receptacle 41a for allowing the battery pack to be recharged via a cable plugged into an electrical outlet or may include an NFC charge receiver for conducting wireless charging.

The battery management unit 42 can include any number of circuits and/or individual components such as diodes, transistors, relays and resistors, for example that can be electrically connected to the batteries to prevent the same from being overcharged and/or for preventing an over voltage or over current situation between the batteries and the controller or power output unit 50.

The power output unit 50 can function to receive and selectively discharge power from the power source in response to a command from the user interface 32. In one embodiment, the power output unit 50 can include a capacitor bank 51, a power inverter 52, a power transformer 53 and a plurality of bleeder resistors 54.

The capacitor bank 51 can function to receive and store electrical energy from the battery pack 45 in response to a user arming the device by depressing the charge switch 33. During the charging process, the display 37 can provide a visual notification to the user that the device is charging via a (yellow) flashing light, for example, and when the capacitor bank is fully charged, the display 37 can turn a solid (green) color. Of course, any number of other notifications and/or colors are also contemplated.

When the device 10 is used as a bang stick (e.g., handheld, and directly engaging the target), and upon receiving a command from the instant discharge switch 34, the capacitor bank can immediately and rapidly discharge the received power to the power inverter, and the display 37 can provide a visual notification such as a solid or flashing (red) light, for example.

Conversely, when the device 10 is used as a harpoon (e.g., being thrown or launched toward the target), and upon receiving a command from the impact discharge switch 34, the controller can wait for a signal from the contact detection sensor 38. Upon receiving a signal from the sensor denoting the penetrating head has made contact with the target, the controller can pause between 0.5 and 1 second, for example, and can then instruct the capacitor bank to immediately and rapidly discharge the received power to the power inverter.

The delay is preferable to allow the penetrating head time to pass into the target to ensure the electrodes will be in direct contact with the target. Of course, other embodiments are contemplated wherein no delay is performed and/or wherein a different delay time is used.

In either instance, the power inverter 42 can function to receive and convert the DC voltage received from the capacitor bank into AC voltage, and the output of the power inverter can be immediately fed into the transformer.

The power transformer 43 can preferably include, comprise, or consist of a variable output step-up transformer that receives the AC voltage from the inverter, increases the same and transfers the energy directly to the electrodes. To this end, the transfer will preferably include functionality for allowing a user to adjust the electrical output across the electrodes via inputs provided to the user interface device (e.g., switches).

In the preferred embodiment, the output of the power transformer to the electrodes can sustain an electric field at a distance of about 75 cm from a point centered between the charge-delivery electrodes up to a range of between 150-300 V/m for up to 30 seconds in seawater having a conductivity of 6 S/m. The electric field frequency will ideally be approximately 1000 Hertz. Such amounts being specifically chosen so as to be suitable for stunning fish ranging from 5 to 55 pounds with sufficient voltage to immobilize the same for a period of about 1 to 3 minutes, when the device is in stun mode.

Conversely, when the device is in a dispatch mode, the higher voltage is specifically chosen to be capable of dispatching an adult alligator weighting at or around 300-500 pounds. Of course, other embodiments are contemplated wherein the device produces and outputs a different electrical amount.

The bleeder unit 54 can also be connected to the capacitor bank 51 and can function to fully dissipate any electric charge in the power output unit. In one embodiment, the bleeder unit can include a switch that can open an electrical pathway from the capacitor bank to a plurality of resistors upon receiving a command from the disarm switch 36. During this time, the display 37 can provide a visual notification that the device is disarming to the user.

In another embodiment, the bleeder unit can be automatically activated by the controller upon determining that the capacitor bank has been in a fully charged state for a predetermined period of time such as 2 minutes, for example. The inclusion of the bleeder unit acts as a built-in safety device to prevent a situation wherein the electrodes are inadvertently discharged, thus ensuring the device remains uncharged and safe between uses. Of course, any number of other components are contemplated for disarming and rendering the system safe.

In operation, the device can be used in two distinct ways, 1) as a bang stick and 2) as a harpoon. When used as a bang stick, a user can grasp the main body to manually align and strike the target with the penetrating head. Upon impact, the user can depress the instant shock switch 34 to impart the selected electrical charge to the electrodes to stun or dispatch the target based on the user settings.

When used as a harpoon, a user can secure a tether onto the retaining clip 13 and arm the device in the manner described above (e.g., via switches 33 and 36). Next, the user can aim and throw the device at the target. When the penetrating head engages and penetrates the target, the device will automatically impart the selected electrical charge to the electrodes to stun or dispatch the target on impact based on the user settings.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A powerhead device, comprising:
   an elongated pole having a first end and a second end;
   a penetrating head that is positioned along the second end of the pole, said penetrating head including a shaft and a sharpened tip;
   a pair of electrodes that are positioned along the shaft of the penetrating head;
   a power source;
   a controller that is in communication with the power source; and
   a power output unit that is configured to selectively supply an electrical charge to the pair of electrodes.

2. The device of claim 1, wherein the power source includes a battery bank.

3. The device of claim 2, wherein the battery bank includes a plurality of rechargeable batteries.

4. The device of claim 3, further comprising:
   a power source regulator having a battery charger that is connected to the power source.

5. The device of claim 1, wherein the power output unit includes a capacitor that is in communication with the power source.

6. The device of claim 5 wherein the capacitor receives power from the power source in response to a user instruction from a user interface.

7. The device of claim 5, wherein the power output unit includes a transformer that is in communication with the capacitor and each of the electrodes.

8. The device of claim 7, wherein the transformer receives power from the capacitor, amplifies the received power, and discharges amplified power to the plurality of electrodes in response to a user instruction from the user interface.

\* \* \* \* \*